Jan. 21, 1969     R. W. STANLEY     3,423,119
APPARATUS FOR HANDLING LOADS
Filed June 6, 1966     Sheet _1_ of 2
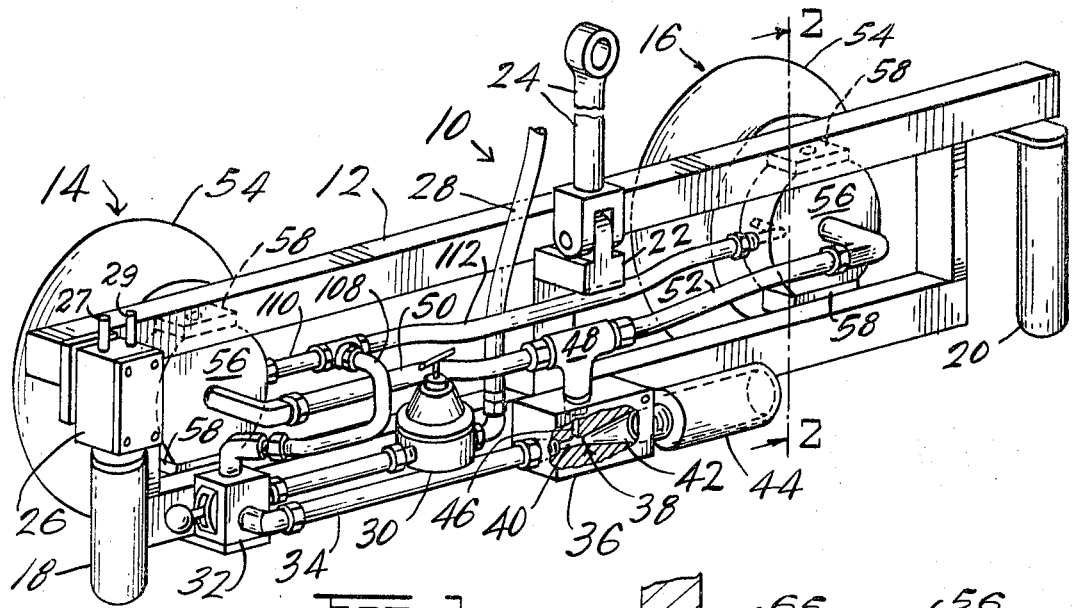
FIG-1-
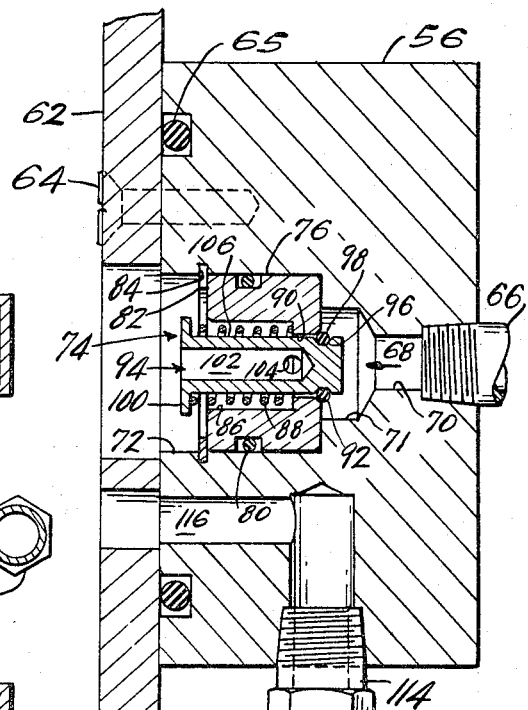
FIG-2-
FIG-3-
INVENTOR:
ROBERT W. STANLEY
BY
ATT'YS.

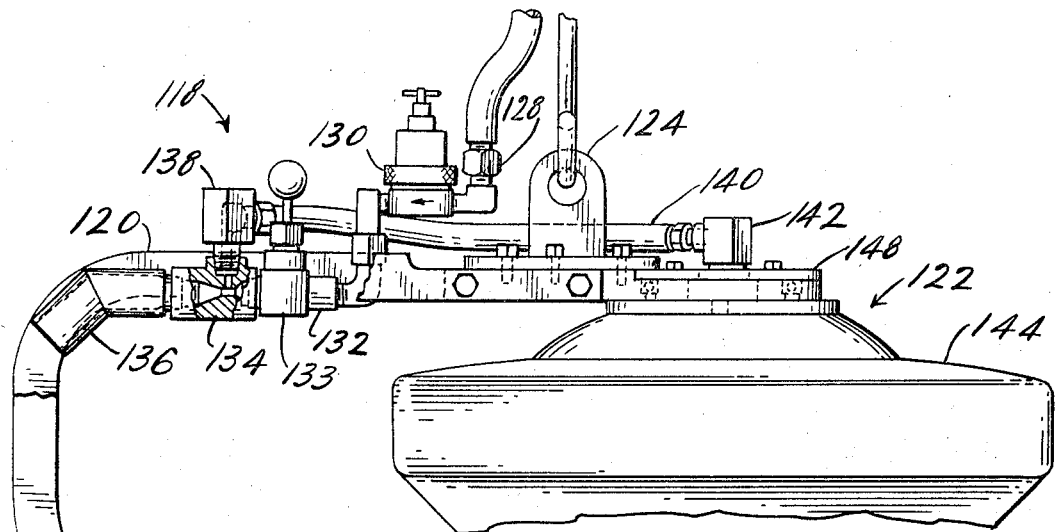
FIG-4-
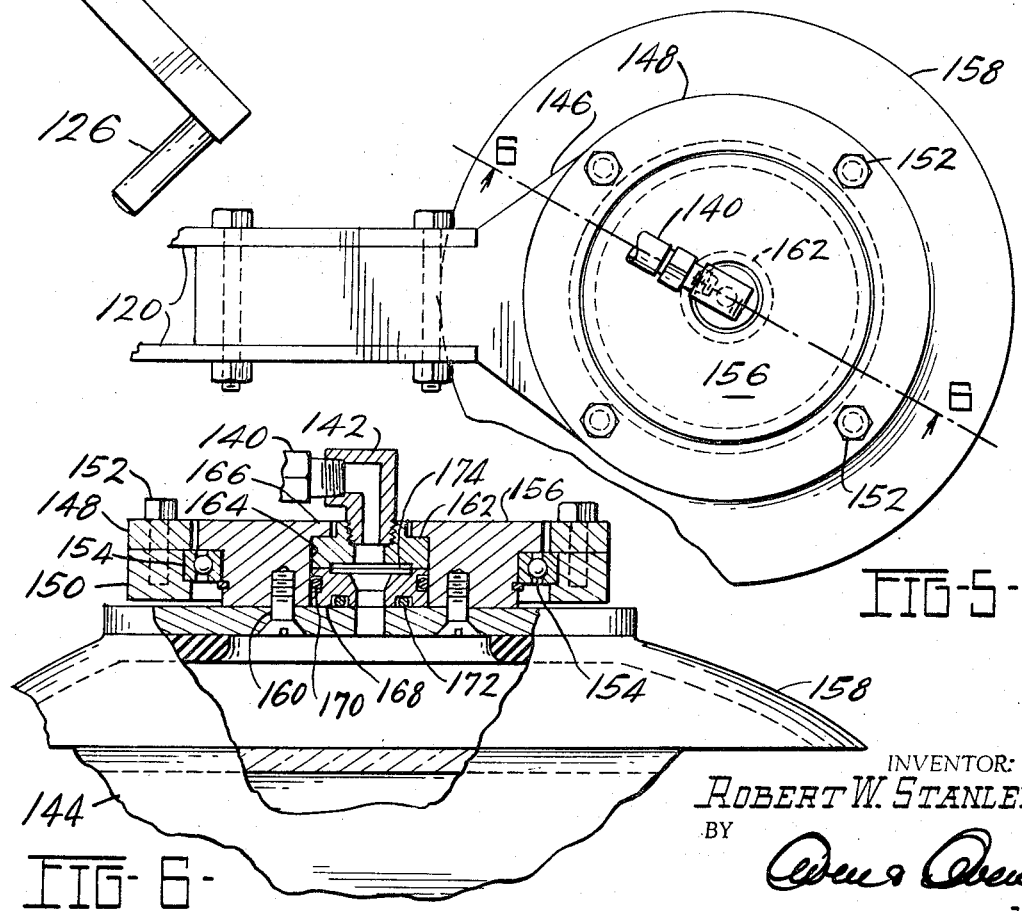
FIG-5-
FIG-6-
INVENTOR:
ROBERT W. STANLEY
BY
ATT'YS.

United States Patent Office 3,423,119
Patented Jan. 21, 1969

3,423,119
APPARATUS FOR HANDLING LOADS
Robert W. Stanley, Toledo, Ohio, assignor to D. W. Zimmerman Mfg., Inc., Toledo, Ohio, a corporation of Ohio
Filed June 6, 1966, Ser. No. 555,442
U.S. Cl. 294—65                                                9 Claims
Int. Cl. A66c 1/02

ABSTRACT OF THE DISCLOSURE

A device for handling a load includes a vacuum cup for engaging and holding the load. A vacuum is established in the cup by means of a venturi tube, with a check valve located between the tube and the vacuum cup to maintain a vacuum in the cup even if air failure occurs. The cup also can be rotatably mounted to enable the load engaged thereby to be pivoted. The vacuum cup can be used with a pneumatically-operated hoist which is controlled by a valve member located adjacent the venturi tube so that the vacuum cup device and the hoist control can be mounted on a single frame.

---

This invention relates to apparatus for handling loads and more particularly to apparatus for holding objects to be transported or manipulated by means of vacuum cups.

Vacuum or suction cups are known in the art for grasping and holding objects during manipulation thereof or operation thereon. While the vacuum cups have been generally satisfactory, they have lacked flexibility in movement so as to inhibit manipulation of the objects in some applications and when air was used to apply suction to the cups, they also presented a problem in the event of air failure since the vacuum cups would then drop the objects. Some safety devices have heretofore been proposed to overcome this problem, but have met with limited success due to slow operation, air leakage, etc.

The present invention relates to improved vacuum cups and air systems for holding objects. The apparatus includes an improved safety device which is quick-acting and inexpensive and can be located in direct communication with the vacuum cup to minimize the chance for leakage in the event of air failure. The new vacuum cup also can be capable of rotating relative to its support to enable the object carried thereby to be more easily manipulated. The vacuum for the cup can be achieved with a venturi tube which provides a reliable and efficient means for achieving the vacuum. Further, the invention contemplates means for supplying air under pressure to the vacuum cup when desired, to effect a rapid release of an object held thereby.

It is, therefore, a principal object of the invention to provide an improved vacuum cup and air system for handling objects.

Another object of the invention is to provide an improved vacuum cup for handling objects, which cup is capable of rotating relative to the support for the cup.

Yet another object of the invention is to provide a vacuum cup system for handling objects with means for effecting rapid release of the object.

Still a further object of the invention is to provide an improved check valve arrangement for a vacuum cup to maintain a vacuum in the cup in the event of air failure.

Other objects and advantages of the invention will be apparent from the following detailed description of preferred embodiments thereof, reference being made to the accompanying drawings, in which:

FIG. 1 is a view in perspective of an object carrier employing two vacuum or suction cups and embodying the invention;

FIG. 2 is an enlarged view of part of the carrier of FIG. 1, taken along the line 2—2 of FIG. 1;

FIG. 3 is a further enlarged view taken centrally through a back portion of the vacuum cup of FIG. 2;

FIG. 4 is a view in elevation of a modified carrier embodying a single vacuum cup;

FIG. 5 is a fragmentary plan view of the carrier of FIG. 4;

FIG. 6 is a somewhat enlarged view in central cross section of the back of the vacuum cup of FIGS. 4 and 5, taken along the line 6—6 of FIG. 5;

Referring more particularly to FIG. 1, an object carrier 10 is designed primarily for holding large relatively flat objects, such as automobile hoods or trunk lids, for example. The carrier 10 includes a rectangular frame 12, a pair of vacuum cup assemblies 14 and 16, and spaced manipulating handles 18 and 20. The handles are spaced apart two to three feet so that an operator can manipulate the carrier relatively easily with one hand on each handle. The carrier 10 has a central pivot bar 22 which pivotally receives a hanger rod 24 for supporting the carrier from a suitable hoist. In a preferred form, the hoist can be fluid-operated of the type shown in a patent to Edgar R. Powell, No. 3,260,508. When this type of hoist is used, a handle-controlled valve housing 26 can be used with the handle 18. Air hoses 27 and 29 then extend from the housing 26 upwardly toward the hoist, along with the hoist cable connected to the hanger rod 24 and along with an air or fluid supply line 28 which supplies air for the vacuum cup assemblies 14 and 16.

Air from the hose 28 is passed through a regulator 30 and then through a four-way valve 32 which is preferably located near the handle 18 so that the operator need not completely release the handle 18 when operating the valve. A suitable gauge can also be employed to indicate the degree of the vacuum in the cup assemblies 14 and 16. A line 34 connects the valve 32 with a venturi tube or body 36 having a venturi passage 38 extending therethrough, the body being suitably affixed to the frame 12. The passage 38 includes a throat 40 and a flared end exhaust portion 42. An exhaust housing or silencer 44 is connected to the exhaust end of the body 36 and dispels the air from the venturi toward one side of the carrier 10.

A transverse passage 46 communicates with the throat 40 of the venturi passage 38 and extends to a surface of the venturi body 36, at which point it is connected to a T-fitting 48. From the fitting 48, lines 50 and 52 extend to the vacuum cup assemblies 14 and 16 respectively. With this arrangement, any air in the cups of the vacuum assemblies is pulled through the lines 50 and 52 and the fitting 48 and is expelled through the throat 40 of the venturi passage 38. The venturi thereby enables a high vacuum to be established and maintained in the cups. If desired, the line 52 can be eliminated and the vacuum cup assembly 16 can be connected directly to the cup assembly 14 through a separate line.

Referring more particularly to FIG. 2, the vacuum cup assembly 16 includes a flexible vacuum cup 54 and a supporting block or mount 56. The block 56, in this instance, is pivotally carried by ears 58 through screws 60, the ears 58 being affixed to the frame 12. This enables the cups 54 to pivot somewhat to enable them to properly adapt to the contour of an object to be lifted. A plate 62 is affixed to or molded in a rear portion of the suction cup 54 to facilitate attachment of the cup 54 to the block 56 by suitable screws 64. The vacuum cup 54 is sealed with respect to the supporting block 56 by an O-ring 65 when connected by the screws 64. The vacuum cup 54 is of a commercially available, conventional design and will not be discussed in detail. The usual concentric grooves can be employed therein to facilitate retaining the object to which it is attached.

The vacuum lines 50 and 52 communicate with the respective vacuum cup assemblies 14 and 16 through fittings 66 (FIG. 3) and through a central passage 68 comprising three portions 70, 71, and 72 of different diameters. A check valve assembly 74 is located in the passage 68 and enables flow of air from the cup 54 through the passage 68 and, hence, the fitting 66 and the line 52 or 50, but prevents flow in the opposite direction. The check valve assembly 74 includes a cylindrical valve seat body 76 located in sealing relation in the passage 68 by an O-ring 80 and held by a split retaining ring 82 located in a groove 84. The body 76 has a large passage 86 for a spring 88, a smaller diameter opening 90, and a valve seat 92. A flow control valve member 94 extends through the small opening or passage 90 and has a groove 96 in which is mounted an O-ring 98 in the passage portions 71. The O-ring 98 is urged against the seat 92 by the spring 88 acting against an annular end flange 100 of the valve member to seal off the passage 70 and the passage 90. When air is supplied through the venturi passage 38, however, and a vacuum exists at the fitting 66, the valve member 94 tends to be pulled against the force of the spring and thereby releases the O-ring 98 from the valve seat 92. Air in the cup 54 can then flow through a central recess 102 in the valve member 94 and through diametrically opposed openings 104 and between the passage 90 and a valve member stem 106. Of course, air may also flow around the stem 106 in the passage 86 if the flange 100 is not pressed tightly against the body 76 by the suction and seals off the passage 86.

The compact size of the check valve and the low mass of the valve member 94 enables the valve to react almost instantaneously so that if the source of air should fail and no air flows through the venturi 38, the check valve will close immediately under the force of the spring 88 and retain the existing vacuum in the cup 54. Further, because the check valve 74 by its design is small so as to be capable of being located in the block 56, there is virtually no chance for air to escape from the system at some point between the check valve and the cup, as in previous carriers wherein, if a safety device was employed, it was located at some distance, in a remote position, from the vacuum cup. By virtue of the small size of the check valve 94 which enables it to react quickly, and by virtue of the fact that the check valve is mounted in the supporting block immediately to the rear of the vacuum cup, the arrangement is highly effective in maintaining a vacuum in the cup even in the event of failure of the air source. It has been found in practice that a vacuum can be retained in the cup 54, and the object then held by the cup for two hours or longer after the air source is off.

When a number of objects are to be handled by the carrier over a period of time, as where trunk lids or hoods are to be picked up, carried to a car body, and held while positioned and assembled therewith, it is advantageous to be able to release the vacuum cups 54 reasonably quickly from the object when desired. Even by venting the lines 50 and 52, however, a short period of time elapses between the venting of the lines and the release of the object by the cups. In operations where this short period of time is considered excessively time consuming, air can be deliberately supplied to the vacuum cups 54 to effect the release almost instantaneously, and even bounce the cups away from the object slightly. For this purpose, the valve 32 is connected to a branch line 108 of FIG. 1 which is connected through lines 110 and 112 to the vacuum cup units. As shown in FIG. 3, the line 112 can be attached to a fitting 114 which is connected through a supply passage 116 eccentrically located with respect to the check valve 74 and communicates directly with the vacuum cup 54. When the valve 32 is moved to the proper position, the supply air is fed through the branch line 108 and to the vacuum cup to effect the immediate release thereof. A flow control valve can be used with the valve 32, if desired, to control the rate of release. In one of its positions, the valve 32 closes the air source from both the lines 34 and 108. If the vacuum for the cup assembly 16 is pulled through the assembly 14, the lines 110 and 112 can serve as the vacuum lines for the assembly 16 as well as the air lines.

Referring now to FIG. 4, a modified carrier 118 is shown. The carrier 118 includes a generally C-shaped frame 120 on which a single vacuum cup assembly 122 is mounted. The frame 120 is connected to a hoist in this instance through an ear 124. A handle 126 can be located at the lower end of the frame 120 or a hoist control handle assembly, similar to the handle 18 and the valve housing 26 of FIG. 1, can be employed.

Air for the vacuum cup assembly 122 can be supplied in a manner similar to that for the carrier 10 of FIG. 1. Air is supplied from an overhead source through a line 128 to a regulator 130 and, hence, through a line 132 and a valve 133 to a venturi body 134 similar to the venturi body 36. The air then can be exhausted through an exhaust housing 136 directing the air downwardly. An L-shaped fitting 138 is located on top of the venturi body 134 and communicates through a transverse passage therein with the throat of the venturi, as in FIG. 1. A suitable flexible line 140 connects the fitting 138 with an L-shaped fitting 142 which communicates with the vacuum cup assembly to exhaust air therefrom. A gauge can be employed to indicate the vacuum in the cup assembly and a suitable air line can also be employed to supply air to the vacuum cup assembly to effect a quick release thereof, if desired.

The peculiar shape of the frame 120 adapts the carrier 118 particularly for use in handling a television tube, indicated at 144, by attaching the vacuum cup assembly to the face of the tube.

In this instance, the check valve assembly 74 of FIG. 3 is located in the L-shaped fitting 138 because of space limitations in the vacuum cup assembly 122. However, it is to be understood that the check valve assembly can be located in the vacuum cup assembly 122 especially in larger sizes.

Referring more particularly to FIGS. 5 and 6, the vacuum cup assembly 122 can be pivoted relative to the frame 120 to enable rotation of the television tube 144 for inspection or operation thereon. For this purpose, the frame 120 has an extension 146 to which is affixed a ring 148. As shown in FIG. 6, the ring 148 is connected to a bearing retaining ring 150 through suitable screws 152 with the ring 150 carrying and retaining a radial thrust bearing 154. The bearing 154 rotatably supports a supporting block or mount 156 to which a vacuum cup 158 is attached by screws 160. The vacuum cup thereby can rotate with the block 156 while the rings 148 and 150 remain stationary.

The fitting 142 must also remain stationary since it is connected to the line 140. To achieve this, the fitting 142 is threadably received in an upper stationary cylindrical member 162 which is rotatably held in a central opening 164 in the member 162 and retained by an annular shoulder 166. The check valve can be located in this member, especially in large size cup assemblies. A lower sealing member 168 is also located in the central opening 164 and is sealed therewith by an O-ring 170. The member 168 is held against the upper member 162 by an O-ring 172 which constitutes resilient means urging the member 168 upwardly when the screws 160 are turned into the supporting block 156. An annular chamber 174 formed by annular recesses in the members 168 and 162 serve to help maintain the members in close contact since a vacuum is established in the chamber 174 by the action of the venturi and this tends to urge the members together. The sealing member 168, because of the engagement with the mounting block 156 and the vacuum cup 158 through the O-rings 170 and 172, thereby rotates with the cup and the mounting block, while being maintained in slidable sealing relation with the upper member 162.

The construction of the vacuum cup assembly 122 enables the cup to rotate relative to the fitting 142 and the frame ring 148 through the bearings 154 and with the member 168 rotating with the mounting block 156 relative to the upper member 162.

The carrier 118 functions in the same manner as the carrier 10. The air supplied through the regulator 130 and through the venturi body 134 establishes a vacuum in the fitting 138 and, with the check valve assembly therein, enables air to be withdrawn from the vacuum cup 158. In the event of air failure, the check valve assembly immediately closes and holds the vacuum in the cup.

I claim:

1. Apparatus for supporting and holding an object comprising a vacuum cup, a supporting block mounted centrally on the back of said vacuum cup, a venturi tube, a line connecting the throat of said venturi tube and said vacuum cup through said supporting block, check valve means between said venturi tube and said cup for sealing against flow of fluid from said venturi tube to said vacuum cup whenever the suction at the throat of said venturi tube is eliminated, means for supplying fluid to said venturi tube to establish suction at the throat, valve means for controlling the supply of fluid to said tube, means for exhausting fluid from said venturi tube and means for supplying fluid through said vacuum cup to the interior thereof to enable an object held by the cup to be released even if said check valve means is in the position sealing against flow.

2. Apparatus according to claim 1 characterized by said check valve means being located in said supporting block adjacent said cup.

3. Apparatus according to claim 1 characterized by means associated with said cup and said supporting block to enable said supporting block to rotatably hold said cup.

4. Apparatus according to claim 1 characterized by said check valve means comprising means forming a valve seat and forming a passage through which fluid can flow from said cup to said venturi tube, a valve member supported for longitudinal movement in said passage and having means cooperating with said valve seat to close said passage when in one position, and means urging said member toward said one position when there is no fluid flowing through said venturi tube.

5. Apparatus for supporting and holding an object comprising a frame, means for connecting said frame to an overhead hoist, a supporting block held by said frame, a vacuum cup affixed to said supporting block at the back of said cup, a venturi tube held by said frame, a line connecting the throat of said venturi tube and said vacuum cup to said supporting block, a check valve between said venturi tube and said cup, a flexible line extending upwardly from said frame for supplying fluid to said venturi tube to establish suction at the throat thereof, valve means for controlling the supply of fluid through said flexible line to said tube, means for exhausting fluid from said venturi tube, a ring extending from said frame, a radial thrust bearing held by said ring, said supporting block having means cooperating with said thrust bearing to enable said block to rotate relative to said ring, an upper stationary member centrally held in said supporting block to receive said line, said upper member being slidably held relative to said supporting block, and a sealing member between said supporting block and said upper member.

6. Apparatus according to claim 5 characterized by resilient means urging said lower sealing member toward said upper member.

7. Apparatus according to claim 5 characterized by said upper and lower members forming an enlarged chamber at the juncture thereof whereby a vacuum is established in said chamber when air is supplied to said venturi tube to aid in holding said members together.

8. Apparatus for supporting and holding an object comprising a frame, means for connecting said frame to an overhead hoist, a supporting block held by said frame, a vacuum cup affixed to said supporting block at the back of said cup, a venturi tube held by said frame, a line connecting the throat of said venturi tube and said vacuum cup to said supporting block, a check valve between said venturi tube and said cup, a flexible line extending upwardly from said frame for supplying fluid to said venturi tube to establish suction at the throat thereof, valve means for controlling the supply of fluid through said flexible line to said tube, means for exhausting fluid from said venturi tube, said frame having handle means comprising a control valve and a rotatable handle effective to control said control valve and operate the hoist to which the frame is connected.

9. Apparatus according to claim 8 characterized by an additional flexible line connecting the source of fluid and said vacuum cup independently of said check valve and said venturi tube, and means for controlling flow of fluid through said additional line to supply fluid to said vacuum cup to effect immediate release thereof from an object being held.

References Cited

UNITED STATES PATENTS

| 2,934,086 | 4/1960 | Blatt | 294—64 |
| 3,033,382 | 5/1962 | Noble et al. | 294—65 |
| 3,181,563 | 5/1965 | Giffen | 294—64 |
| 3,223,442 | 12/1965 | Fawdry et al. | 294—64 |

FOREIGN PATENTS

| 1,181,882 | 4/1962 | Germany. |

EVON C. BLUNK, *Primary Examiner.*

R. D. GUIOD, *Assistant Examiner.*